United States Patent [19]

Czernakowski et al.

[11] Patent Number: 4,653,809
[45] Date of Patent: Mar. 31, 1987

[54] CHILD-PASSENGER SAFETY RESTRAINT

[75] Inventors: Waldemar Czernakowski, Blaustein; Hermann Wetter, Ulm; Bernhard Felsch, Münsing, all of Fed. Rep. of Germany

[73] Assignees: Romer Britax Autogurte GmbH, Ulm; ADAC e.V., Munich, both of Fed. Rep. of Germany

[21] Appl. No.: 710,836

[22] Filed: Mar. 12, 1985

[30] Foreign Application Priority Data

Mar. 13, 1984 [DE] Fed. Rep. of Germany ....... 3409074

[51] Int. Cl.⁴ ............................................. B60R 21/10
[52] U.S. Cl. .................................. 297/487; 297/250; 297/488; 280/751
[58] Field of Search ............... 297/488, 216, 467, 487, 297/250; 280/751

[56] References Cited

U.S. PATENT DOCUMENTS

| | | | |
|---|---|---|---|
| 575,787 | 1/1897 | Voiter | 297/487 X |
| 2,833,554 | 5/1958 | Ricordi | 280/751 |
| 3,203,709 | 8/1965 | Presunka et al. | 280/751 |
| 3,279,817 | 10/1966 | Henry | 297/488 X |
| 3,811,701 | 5/1974 | Grime | 297/488 X |
| 3,881,744 | 5/1975 | Tupper | 280/751 |
| 3,948,556 | 4/1976 | Hyde et al. | 297/250 |
| 4,067,608 | 1/1978 | Wimmersperg | 297/488 X |
| 4,300,799 | 11/1981 | Cunningham | 297/487 |

FOREIGN PATENT DOCUMENTS

| | | | |
|---|---|---|---|
| 2549064 | 5/1977 | Fed. Rep. of Germany | 280/751 |
| 1432592 | 4/1976 | United Kingdom | 297/488 |
| 2003096 | 3/1979 | United Kingdom | 280/751 |

*Primary Examiner*—Peter A. Aschenbrenner
*Attorney, Agent, or Firm*—Karl F. Ross; Herbert Dubno

[57] ABSTRACT

The child-passenger safety restraint for a seat of a vehicle comprises a safety seat positioned on the vehicle seat and a restraining body securable by a safety belt of the vehicle seat, the restraining body being held on the safety seat with its relative height and horizontal position adjustable according to the size of the child seated. The restraining body and the safety seat are attached to each other by a coupling mechanism that includes at least one member adjustable in itself and/or relative to the safety seat and/or relative to the restraining body and securable in a particular position, with whose help the optimum position of the restraining body for safe restraint is adjustable and securable relative to the safety seat and the child. The coupling mechanism guides the restraining body back and forth between this optimum position for safe restraint and a releasing position for removing or putting in the child so that the restraining body automatically returns to the optimum position for safe restraint without additional adjustment or examination, when the child is reseated.

9 Claims, 19 Drawing Figures

CHILD-PASSENGER SAFETY RESTRAINT

FIELD OF THE INVENTION

Our present invention relates to a child-passenger safety restraint and, more particularly, to a child-passenger safety restraint adapted to be mounted on a seat of a vehicle, especially the seat of an automobile, but also for other modes of transport such as an airplane or the like, which in case of an accident or sudden stop acts to restrain and protect the child passenger who is generally too small to use the standard adult safety belt provided with the vehicle seat effectively.

BACKGROUND OF THE INVENTION

Local law and good safety practices require frequently that a child be provided with a safety restraint having a safety seat which can rest on the seat of the vehicle and a restraining body securable against the child by the safety belt of the seat, the restraining body being held on the safety seat and being adjustable back and forth in the travel direction and in its height relative to the safety seat according to the size of the child seated.

This kind of child-passenger safety restraint is taught in German patent document (open application) DE-OS No. 30 19 153. In these known child-passenger safety restraints the restraining body is essentially U-shaped and is put on the safety seat with the arms of the U directed downwards. The inverted U-shaped restraining body is provided with approximately vertical fastening rods, which are inserted into guides of the safety seat. In order to compensate for the different sizes of different children, several guides lying one behind another in the seating direction are provided for the clamping rods. Moreover the clamping rods are provided with notches or indentations, by which the restraining body is held at different heights by corresponding detents in the guides of the safety seat receiving the clamping rods.

Of course with the aid of these clamping rods and the guides receiving them, the restraining body can be adjusted in height and back and forth in the seating direction in steps relative to the safety seat according to the size of the child.

However this adjustment is lost when the restraining body is removed from the safety seat as is common, for example, when the child is removed from the child safety seat, and each time must be adjusted anew, when the restraining body is put back on the safety seat when the child is reseated. This requires care and attention each time the child is reseated.

OBJECTS OF THE INVENTION

The general object of our invention is to provide a child-passenger safety restraint of the foregoing general type in which the restraining body, even after repeated in and out movementt of the child, always is reliably returned to a previously set or initially adjusted (fitted) known optimum position for the safety of this child so that a new adjustment and examination of this position each time is not necessary.

It is, therefore, an object of this invention to provide an improved adjustable child-passenger safety restraint for a seat of a vehicle such as an automobile, airplane or the like.

It is another object of this invention to provide an improved adjustable child-passenger safety restraint for a seat of a vehicle which can be used repeatedly by the same child without requiring reexamination and readjustment each time the child is reseated.

It is yet another object of this invention to provide an improved child-passenger safety restraint for a seat of a vehicle which is adjustable with respect to the size of the child using it, but does not need to be readjusted each time the child is reseated once it has been initially adjusted for that particular child.

SUMMARY OF THE INVENTION

These objects and others which will be apparent hereinafter are attained in accordance with the invention in a child-passenger safety restraint for a seat of a vehicle comprising a safety seat positioned on the seat of the vehicle and a restraining body held on the safety seat securable by a safety belt of the vehicle seat, the restraining body being adjustable in its height from the safety seat and back and forth in the seating direction on the safety seat according to the size of the child being carried in the vehicle.

According to the invention the safety seat and the restraining body are connected by a coupling mechanism having at least one member adjustable relative to the mechanism and/or relative to the safety seat and/or relative to the restraining body and securable in a particular position, and with which the optimum position of the restraining body for safety is attainable and securable. The restraining body can be guided between this optimum position for safe restraint and a releasing position for setting in or removing the child from the safety seat repeatedly without adjustment, simply by swinging the restraining body between these positions.

The advantage achieved by our invention is that the restraining body, which is guided by the coupling mechanism between those positions by the daily climbing in and out by the child always reassumes the unique optimum restraining position in which the safety belt, upon automatic return of the restraining body to the initially adjusted optimum position for safe restraint with respect to the safety seat and the seated child, can be brought into play when the child is reseated.

According to a feature of the invention the coupling mechanism comprises a connecting arm and a lower pivot joint, wherein the lower pivot joint has a first pivot axis transverse to the direction of vehicle travel and is attached to the safety seat so as to be vertically adjustable and fastenable in a particular position, and the connecting arm carrying the restraining body pivotally about the lower pivot joint has a limited intrinsic stiffness of rigidity and is flexible beyond the limit of that limited rigidity.

In this embodiment the lower pilot joint makes possible the optimization of the restraining position in the vertical sense. The flexibility of the connecting arm allows a continuous fine compensation of the vertical and horizontal positions of the restraining body about the optimum. Moreover it is sufficient that the connecting arm be flexible only in a plane approximately perpendicular to the first pivot axis, in order to permit slight vertical adjustments of the position of the restraining body. For example, this plays a role in safety, in that the restraining forces are borne by the safety belt, not the connecting arm.

In another preferred embodiment of this invention the height adjustability of the lower pivot joint can be adjustably movable on a slide guide and is securable in a selected position on the guide. With proper orientation of the guide not only is a corresponding adjustment of the height of the restraining body allowed, but this same sliding motion also allows adjustments back and forth in the vehicle-travel direction.

Moreover it has been found to be particularly advantageous to provide the lower pivot joint of the connecting arm, itself or via its guide with a second pivot axis so as to swing in the travel direction of the vehicle and the restraining body can thus be rotated approximately through 90° in the direction of travel so as to be able to more easily free the seated child. Similarly the connecting arm in any of the embodiments discussed here can be pivotally attached by an upper pivot joint to the restraining body so that the restraining body can be rotated away from the child upwardly or at a 90° angle in order to provide free access to the safety seat.

In another specific embodiment of the invention the coupling mechanism comprises a circular arc shaped guide for adjustment of the coupling member in a vertical or horizontal guide plane under the child directed in or counter to the travel direction. One of the guide members comprising the guide is connected to the safety seat or the restraining body so as to be vertically adjustable and securable in a particular vertical position. Here also we prefer that the restraining body to which the guide member be attached is pivotable at an upper pivot joint about a third pivot axis radially directed to the center of the arc-shaped guide in order to improve the free access to the safety seat.

In all cases the coupling mechanism is provided only on one side or only in the middle of the safety seat and the restraining body. The coupling mechanism can be attached directly to the side of the safety seat.

In another embodiment of our invention the coupling mechanism can be attached to a base form and force fittingly, but detachably and specifically locked onto a projecting guide for the safety belt provided on the safety seat. This kind of projecting guide serves commonly with the safety seat in question to secure the safety seat itself at the same time as the restraining body by the abdominal belt so that in case of an accident or sudden stop the safety seat is not thrown forward in the direction of travel from the vehicle seat.

A further very advantageous feature of the coupling mechanism is a four-pivot joint with two restraining body pivot joints associated with the restraining body and two safety seat pivot joints associated with the safety seat, wherein at least one adjustable-length rod provided to connect the joints associated with the restraining body to the joints associated with the safety seat. When two mechanism rods are used, the one of the mechanism rods advantageously positioned to the rear of the other rod in the direction of vehicle travel is of an adjustable length so that the optimum position for safe restraint can be adjusted for different size children.

BRIEF DESCRIPTION OF THE DRAWING

The above and other objects, features and advantages of the invention will become more readily apparent from the following description, reference being made to the accompanying highly diagrammatic drawing in which:

FIGS. 5c and 5d are detail views relevant to the embodiment of FIG. 5a;

SPECIFIC DESCRIPTION

The child-passenger safety restraint shown in the drawing comprises a safety seat 2 positioned on a seat 1 of a vehicle and a restraining body 4 securable by the safety belt 3 of the vehicle seat 1. The back of the vehicle seat 1 is indicated at 5 in the drawing.

The restraining body 4 is held above the safety seat 2 and is adjustable in its relative position back and forth in the seating direction and in its height according to the size of the child 30. Furthermore the safety seat 2 and the restraining body 4 are connected by coupling mechanism 26. This coupling mechanism 26 has at least one coupling member adjustable relative to the safety seat 2 and to the remainder of the mechanism and securable in a particular position, with whose aid the optimum position of the restraining body 4 for optimum safety is adjustable and securable relative to the safety seat 2 and the child 30.

Figure 2:
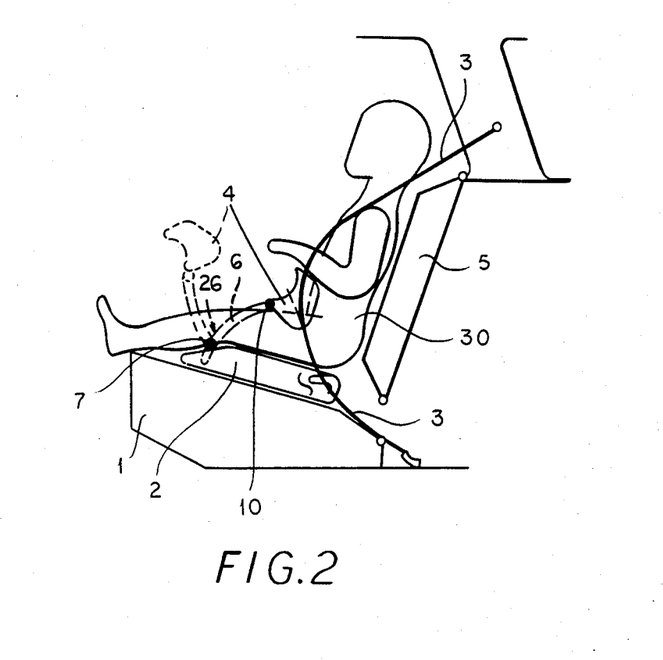
FIG. 2 is a side view of the child-passenger safety restraint according to FIG. 1.

Moreover the coupling mechanism 26 causes an automatic guiding of the restraining body 4 between the optimum position referred to above and a releasing position for seating or removal of the freed child 30, which is shown with broken lines in some of the accompanying drawings, e.g. FIG. 2. Thereby the restraining body 4 is movable back and forth between the optimum position and the position in which the child 30 is released from the safety seat 2 repeatedly without readjustment being required for a particular child 30.

In the specific embodiments shown in FIGS. 1, 2 and 4 to 7 the coupling mechanism 26 comprises a connecting arm 6 and a lower pivot joint 7. The lower pivot joint 7 has a first pivot axis which is horizontal and transverse to the travel direction of the vehicle and its height with respect to the safety seat 2 is adjustable, and is securable in a particular position, for example, by clamping. The connecting arm 6 supporting the restraining body 4 pivotably about the lower pivot joint 7 has a limited inherent rigidity and beyond its elastic limit is flexible so that it is guided back into the optimum particularly position for safety. However slight position adjustments of the restraining body 4 can result, for example, in an accident, when the restraining body 4 experiences the restraining force of the safety belt 3. Thus in an accident the connecting arm 6 takes practically no force worth mentioning. In principle it is sufficient that the connecting arm 6 be only flexible in a plane approximately perpendicular to the first pivot axis.

Figure 1:
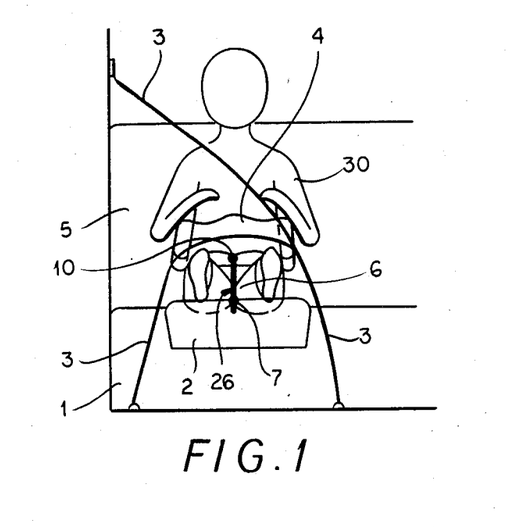
FIG. 1 is a front view of a specific embodiment of the child-passenger safety restraint of our invention.
Figures 1A, 1B, 1C, 9A:
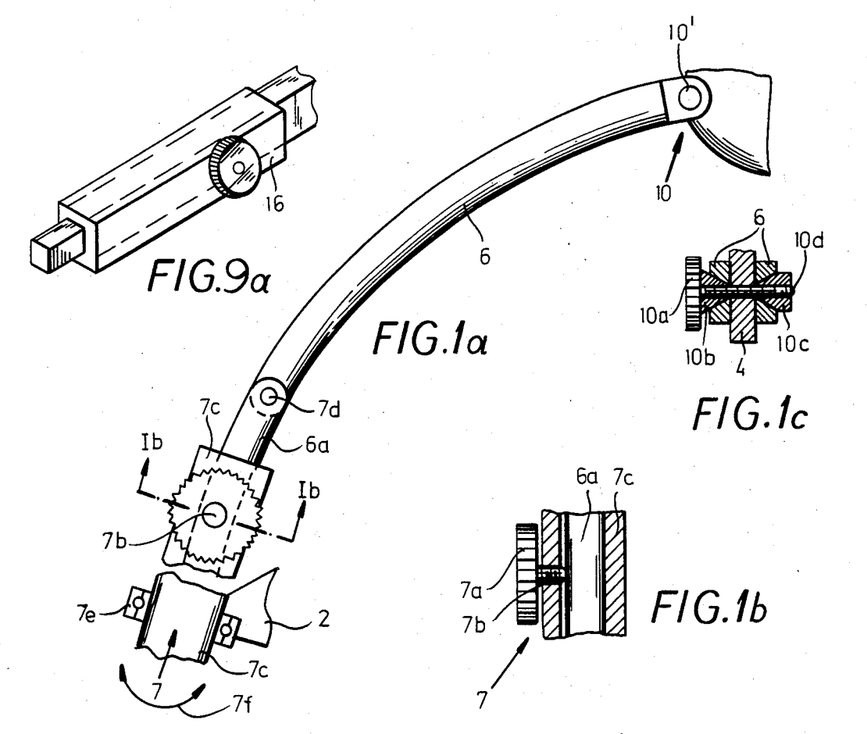
FIG. 1a is a detail of a coupling mechanism for this safety restraint.
FIGS. 1b and 1c are additional detail sections.
FIG. 9a is a perspective detail view of the latter embodiment.

As can be seen from FIG. 1a, the arcuate limitedly stiff bar can have its lower pivot 7d connected to an extension 6a sliding in a sleeve 7c. The bar 6 is positioned in height and in the direction of travel by a screw 7b threaded into a wall of the sleeve 7c (FIG. 1b) and bearing upon the bar 6a. Thus the height can be selected and locked. To free the child, the bar 6 can be swung in a counter-clockwise sense about the pivot 7d.

In addition the arcuate guide 7c can itself be pivotable about its axis in a pivot arrangement 7e on the seat 2 to allow the arm and the restraint body to be swung to one side or another.

The pivot 10' can, when the pivot 7d is used, be locked in position for the particular child, by a screw 10d whose milled head is shown at 10a. This scew engages a frustoconical nut 10c and draws this nut and a frustoconical boss 10b into tapered bores of the arms of the bifurcated upper end of the bar 6 thereby clamping the restraining body between these arms.

Figure 4:
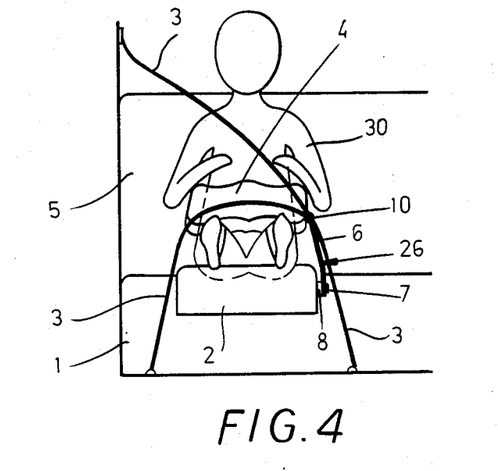
FIG. 4 is a front view of yet another specific embodiment of the child-passenger safety restraint of our invention.
Figure 5A:
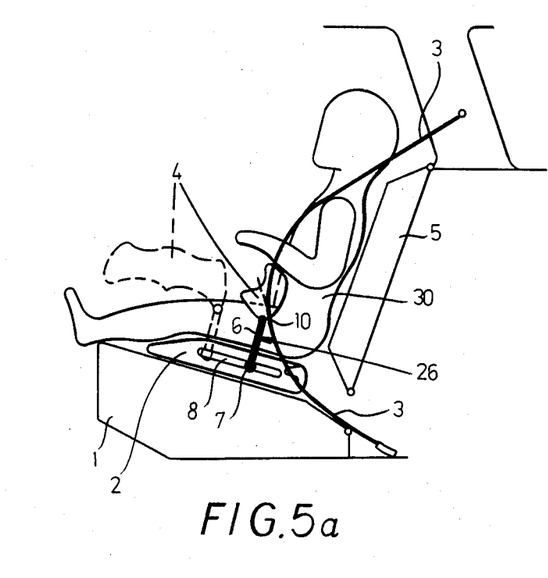
FIG. 5a is a side view of the child-passenger safety restraint according to FIG. 4.

The height adjustability of the lower pivot joint 7 can be incorporated in the apparatus according to the embodiment of FIGS. 4 and 5a by mounting the lower pivot joint 7 on a slide 8. The lower pivot joint 7 is fastenable at the desired position along the slide 8. By an appropriate inclination of the slide 8 to the horizontal adjustment of the restraining body 4 back and forth in the direction of travel as well as in height can be made. Moreover as shown by the dotted lines in FIG. 5a, the connecting arm 6 can be made rotatable about an additional, second pivot axis perpendicular to the first pivot axis at the lower pivot joint 7 or about an upper pivot joint 10 attached to the restraining body 4, so that it is pivotable sidewise and/or upwardly with respect to the direction of travel into a releasing or back position away from the child 30. Thus the accessibility to the safety seat 2 is improved.

Figure 5B:
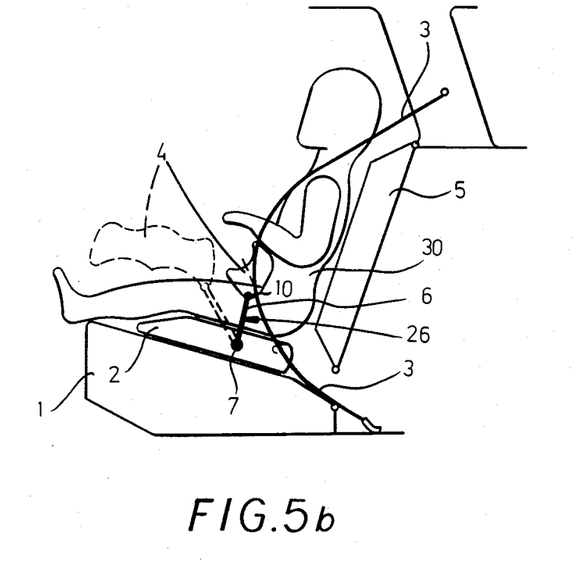
FIG. 5b is a side view of the child-passenger safety restraint according to an alternative embodiment of our invention.
Figure 5C:
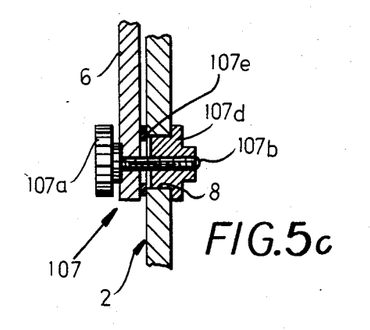

As is apparent from FIG. 5c, the slide 8 is a slot in the side wall of the seat 2 and the bar 6 can be clamped against this wall by the tightening of a screw 107b rotated by a milled head 107a for the locking mechanism 107 shown. A washer is located between the bar 6 and the wall of the seat while a nut 107d rides along the groove and is nonrotatable therein while having a shoulder braced against the opposite side of the wall.

Figure 5D:
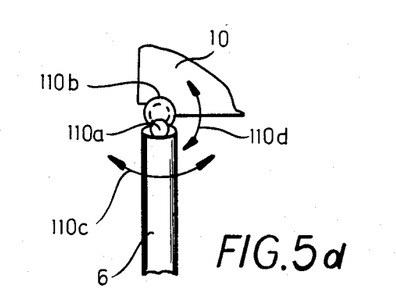

At the pivot 10, a ball head 110a and a socket 110b can form the pivot members allowing pivoted movement about either of two radial axes are represented by the arrows 110c and 110d.

Figure 3A:
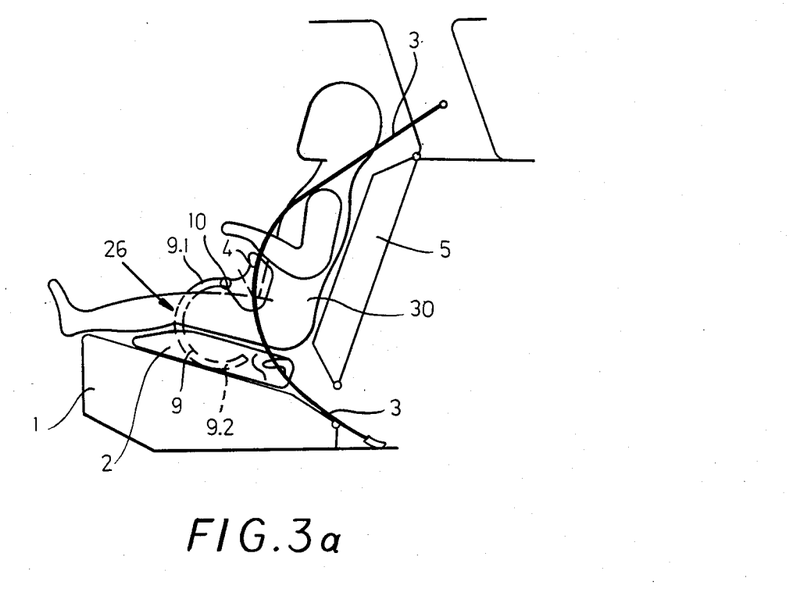
FIGS. 3a and 3b are side views of other embodiments of the child-passenger safety restraint of our invention.

FIG. 3a shows a specific embodiment, in which the coupling mechanism 26 comprises a circular arc shaped guide 9 lying in a vertical guide plane oriented in the direction of travel. One of both guide elements 9.1 and 9.2 comprising the arc shaped guide 9 is adjustably attached on the restraining body 4 of safety seat 2 and secured in a particular position. In the specific embodiment of FIG. 3a this is the guide element 9.1. Guide element 9.1 is attached to the retraining body 4. Besides the possibility also exists to support the restraining body 4 pivotally on an upper pivot joint 10 on guide element 9.1 so that it is pivotable about a third pivot axis directed radially toward the center of the circular arc shaped guide 26. Then the restraining body 4 can be swung away from or up from the child 30 as in the embodiment of FIG. 5b.

Figure 3B:
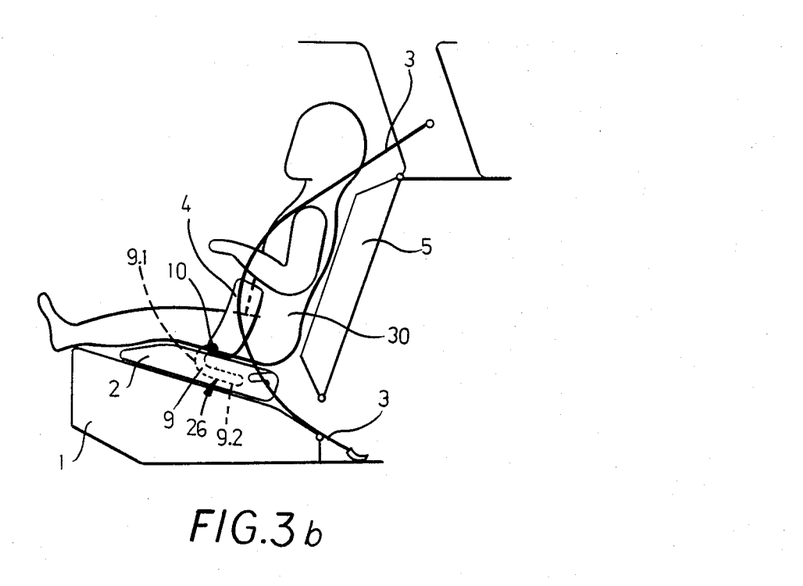

In all cases the coupling mechanism 26 is attached only on one side of the safety seat 2, as in the case of FIGS. 4 to 7, or in the center of the safety seat 2 and the restraining body 4, as in the case of FIGS. 1 to 3.

Figure 6:
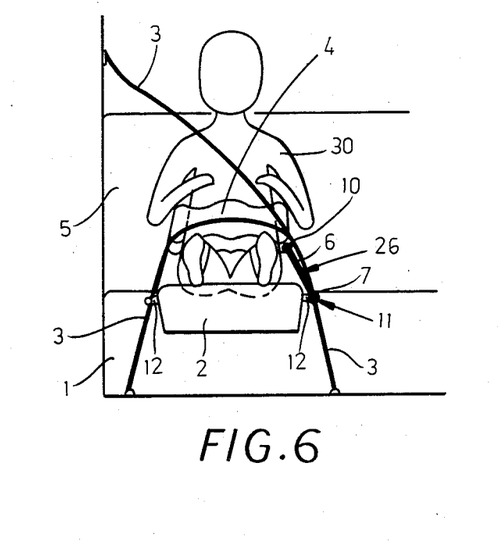
FIG. 6 is a front view of another specific embodiment of the child-passenger safety restraint of our invention.
Figure 7:
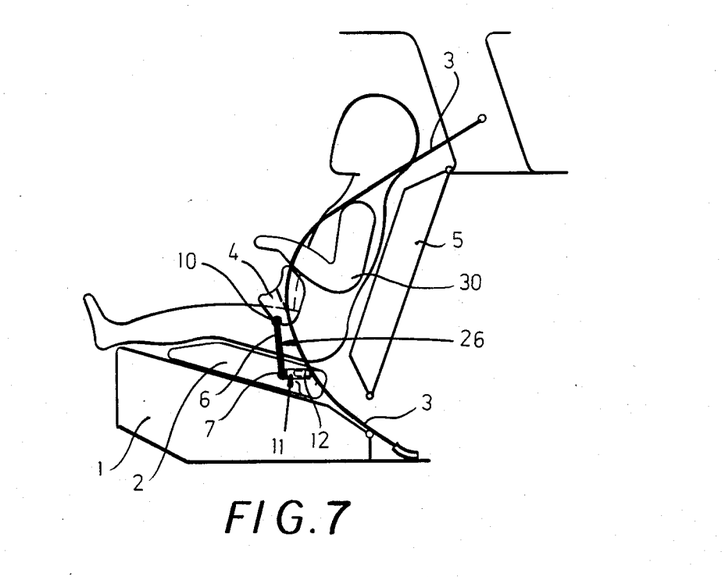
FIG. 7 is a side view of the child-passenger safety apparatus according to FIG. 6.
Figure 7A:
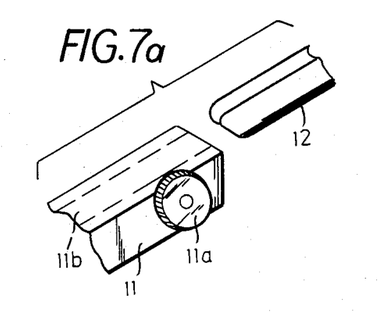
FIGS. 7a and 7b are detail views relevant to the embodiment of FIG. 7.
Figure 7B:
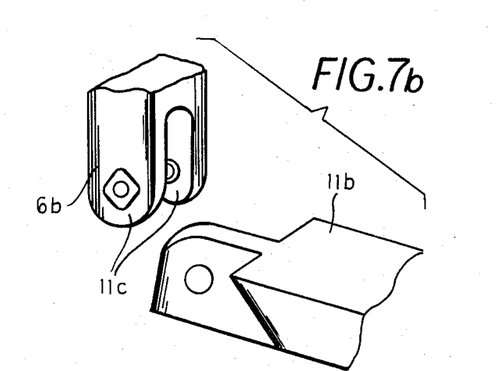

Instead of connecting the coupling mechanism 26 directly to a side of the safety seat 2, we can, as shown in FIGS. 6 and 7, attach the coupling mechanism 26 to a base 11, which is form and force fittingly attached and locked to, but detachable from, a projecting guide 12 provided on the safety seat 2 for the safety belt 3, wherein these projecting guides 12 prevent the safety seat 2 in an accident from sliding forward from the vehicle seat 1.

The mechanism of FIG. 7 can include a sleeve 11b provided with a locking screw, whose milled head is shown at 11a, for engagement with the tongue or guide 12 to form the form and force fitting coupling. The sleeve 11b in turn have a tongue 11c received in a bifurcated end 6b of the connecting bar, a screw mechanism as shown in FIG. 1c locking the assembly together. The restraining body 4 can be swung outwardly at the upper pivot.

Figure 8:
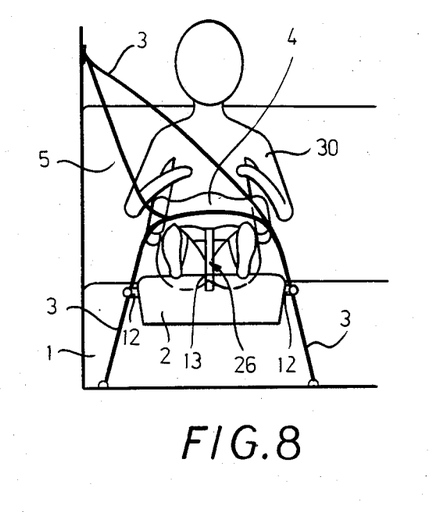
FIG. 8 is a front view of another further specific embodiment of the child-passenger safety restraint of our invention.
Figure 9:
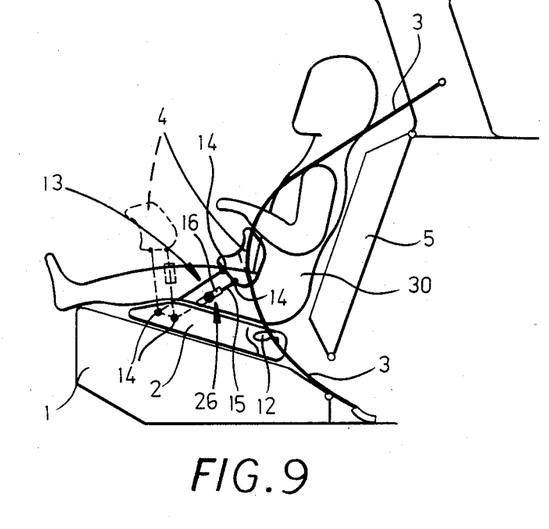
FIG. 9 is a side view of the child-passenger safety restraint according to FIG. 8.

The arrangement of FIGS. 8 and 9 shows that at least the pelvic portion of the safety belt 3 is guided on the restraining body 4 and also simultaneously in the projecting guides 12 so as to lock and hold under the stress of an accident or sudden stop.

Alternatively to the embodiment shown in FIGS. 6 and 7, and 5a, the coupling mechanism 26 can be directly attached to one side of the safety seat 2 as seen in FIG. 5b. The coupling mechanism 26 here comprises a lower pivot joint 7 and a connecting arm 6 similar to the embodoment of FIGS. 1 and 2. Additionally connecting arm 6 is attached to restraining body 4 by an upper pivot joint 10.

Finally the specific embodiment according to FIGS. 8 and 9 shows that the coupling mechanism 26 can also be constructed as a four-pivot joint 13 with two safety seat pivot joints 14 associated with the safety seat 2 and two restraining body pivot joints 14 associated with the restraining body 4. Two mechanism rods 15 are preferably used to connect the pivot joints 14 on the restraining body 4 with those of the safety seat 2. At least the mechanism rod 15 positioned to the rear of the other mechanism rod 15 shown in FIG. 9 with respect to the direction of travel, is of an adjustable length by a telescoping sleeve and locking screw arrangement as shown at 16 in FIG. 9a in order that the height of the restraining body 4 can be adjusted with the restraining body 4 in position against the seated child 30.

One recognizes moreover, that the child-passenger safety restraint, as in the examples shown, does not absolutely require a three-point pelvic belt, and that also a two-point pelvic belt can be used.

We claim:

1. In a child-passenger safety restraint for protecting a child-passenger of a vehicle in case of an accident or a sudden stop comprising a safety seat member positioned on a vehicle seat member of said vehicle and a restraining body member held on said safety seat member, said restraining body member being securable by a safety belt of said vehicle seat member, the height of said restraining body member being adjustable relative to said safety seat member according to the size of said child-passenger, and said restraining body member also being adjustable back and forth in the seating direction relative to said safety seat member according to said size of said child-passenger, the improvement wherein said safety seat member and said restraining body member are attached to each other by a coupling mechanism having at least one coupling member, said coupling member being adjustable relative to at least one of the others of said members so as to vary said height of said restraining body member above said safety seat member and move said restraining body member back and forth in said seating direction relative to said safety seat member, said restraining body member being thereby fastenable in an optimum position for safe restraint of said child-passenger, and said restraining body member being movable back and forth between said optimum position for safe restraint and a releasing position in which said child-passenger can be seated in or removed from said safety seat member repeatedly without readjustment of the relative position of said coupling member and said others of said members, and wherein said coupling member comprises a connecting arm having a lower pivot joint attached to said safety seat member, the height of said lower pivot joint on said safety seat member being adjustable, a first pivot axis of said lower pivot joint lying substantially horizontal and transverse to the travel direction of said vehicle, said connecting arm being attached to said restraining body member and having a limited intrinsic stiffness and beyond the limits of said stiffness being flexible.

2. The improvement according to claim 1 wherein said coupling member is adjustable relative to said safety seat member.

3. The improvement according to claim 1 wherein said coupling member is adjustable relative to said restraining body member.

4. The improvement according to claim 1 wherein said coupling member is adjustable relative to both said safety seat and said restraining body members.

5. The improvement according to claim 1 wherein said lower pivot joint is slidably mounted in an elongate groove defining a slide and is thereby adjustable.

6. The improvement according to claim 1 wherein said connecting arm is also pivotable at said lower pivot joint about a second pivot axis defined by the axis of a guide for said arm.

7. The improvement according to claim 1 wherein said connecting arm is attached to said restraining body member at an upper pivot joint and said restraining body member is pivotable about said upper pivot joint.

8. The improvement according to claim 1 wherein said coupling mechanism is attached substantially in the middle of said safety seat and said restraining body members.

9. In a child-passenger safety restraint for protecting a child-passenger of a vehicle in case of an accident or a sudden stop comprising a safety seat member positioned on a vehicle seat member of said vehicle and a restraining body member held on said safety seat member, said restraining body member being securable by a safety belt of said vehicle seat member, the height of said restraining body member being adjustable relative to said safety seat member according to the size of said child-passenger, and said restraining body member also being adjustable back and forth in the seating direction relative to said safety seat member according to said size of said child-passenger, the improvement wherein said safety seat member and said restraining body member are attached to each other by a coupling mechanism having at least one coupling member, said coupling member being adjustable relative to at least one of the others of said members so as to vary said height of said restraining body member above said safety seat member and move said restraining body member back and forth in said seating direction relative to said safety seat member, said restraining body member being thereby fastenable in an optimum position for safe restraint of said child-passenger, and said restraining body member being movable back and forth between said optimum position for safe restraint and a releasing position in which said child-passenger can be seated in or removed from said safety seat member repeatedly without readjustment of the relative position of said coupling member and said others of said members, and further comprising the improvement wherein said coupling mechanism comprises a circular arc shaped guide having a guide plane directed in or counter to the travel direction of said vehicle and a guide member connected to said retraining body member so as to be of adjustable height relative to said safety seat member and fastenable at a particular position.

* * * * *